Dec. 30, 1941.　　　F. T. NEWELL ET AL　　　2,268,263
PIPE FITTING
Filed May 15, 1941　　　3 Sheets-Sheet 1
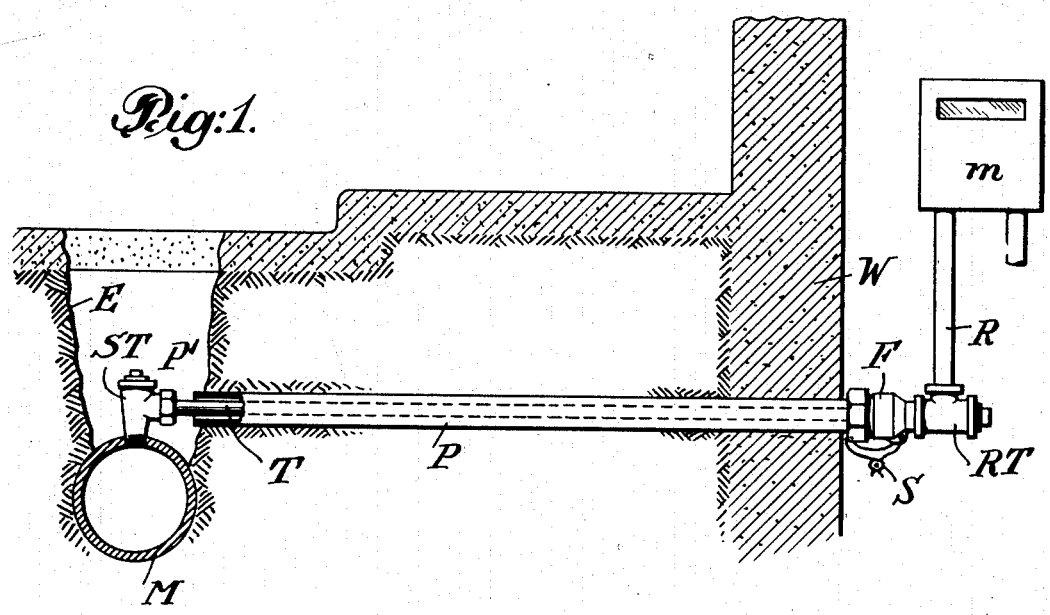
Fig:1.
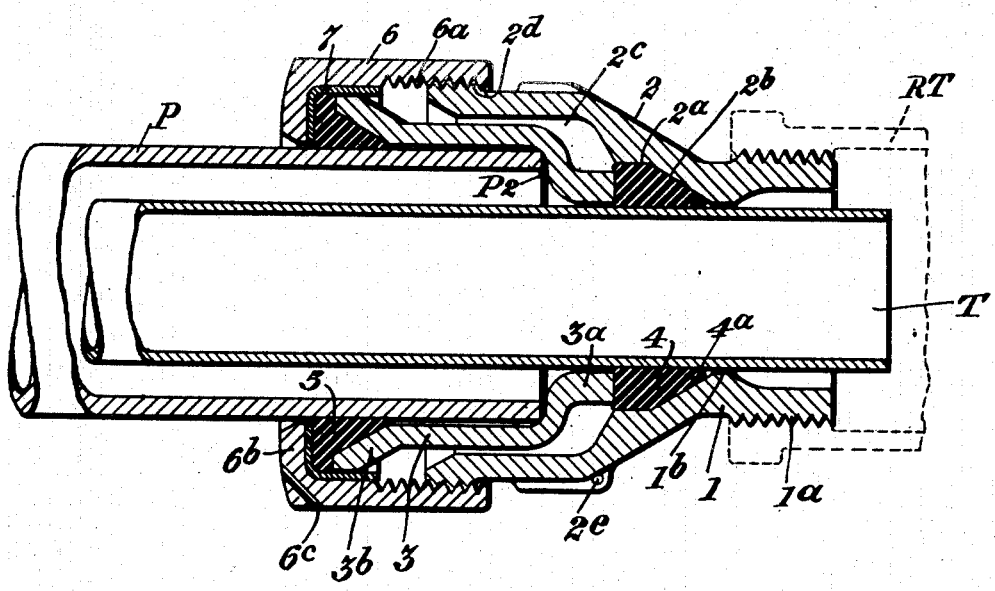
Fig:2.
Frederick T. Newell
George E. Sekely
INVENTORS
BY Louis Prescott Whitaker
ATTORNEY Dec. 30, 1941.  F. T. NEWELL ET AL  2,268,263
PIPE FITTING
Filed May 15, 1941  3 Sheets-Sheet 2

Frederick T. Newell
George E. Szekely
INVENTORS

BY Louis Prevost Whitaker
ATTORNEY

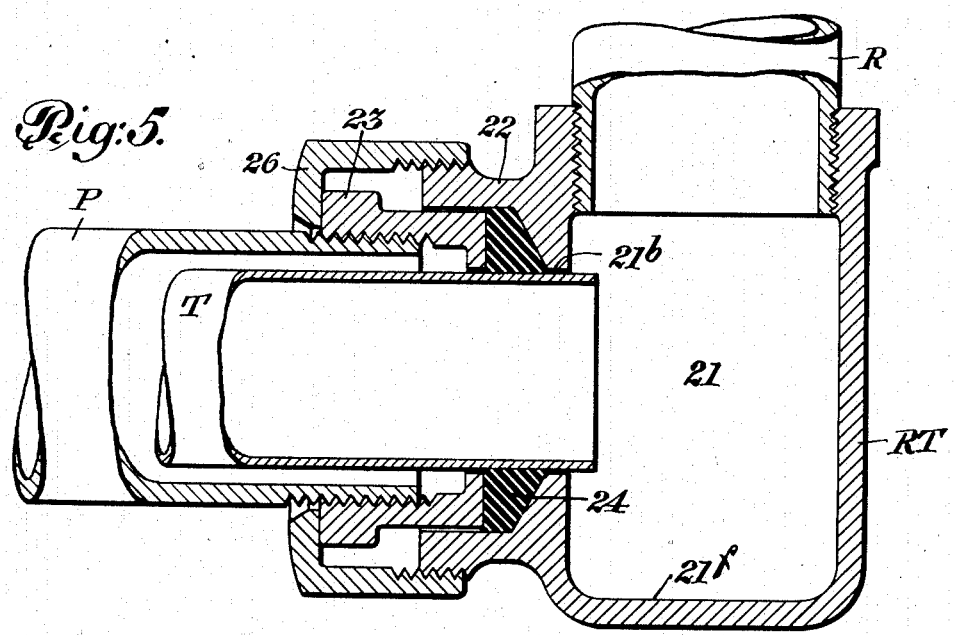
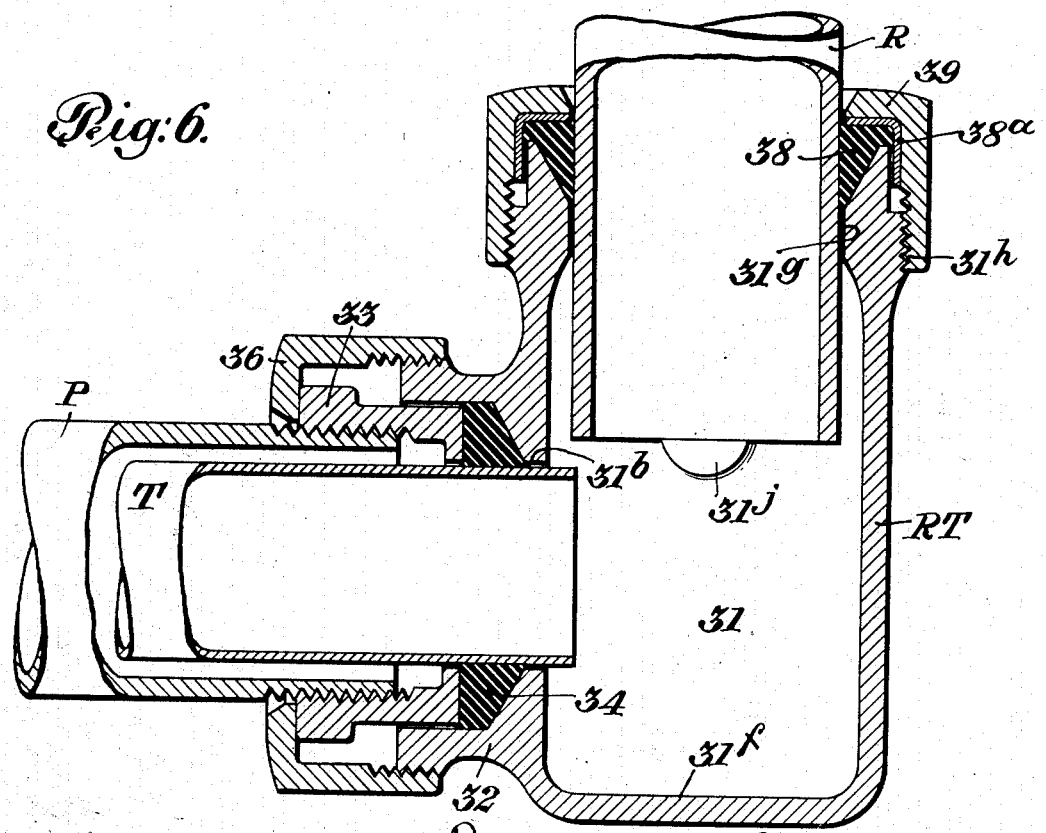

Patented Dec. 30, 1941

2,268,263

UNITED STATES PATENT OFFICE 2,268,263

PIPE FITTING

Frederick T. Newell and George E. Szekely, Bradford, Pa., assignors to Dresser Manufacturing Company, Bradford, Pa., a corporation of Pennsylvania Application May 15, 1941, Serial No. 393,544

7 Claims. (Cl. 285—22)

Our invention consists in the novel features hereinafter described, reference being made to the accompanying drawings which show several embodiments of our invention selected by us for the purpose of illustration.

Our invention relates to pipe fittings, and particularly to pipe fittings for connecting a replacement service pipe with the piping inside a building. In the past the service lines for gas, water, etc., extending from the main located beneath the street to the customer's premises have been iron or steel pipe and have been attacked by corrosion, making replacement necessary. To avoid the necessity of digging a trench across the customer's property to uncover the service pipe, it has been found highly desirable to insert a new service line of smaller diameter through the existing service. This requires digging only a small excavation at the main for connecting the new service line. While any suitable type of conduit may be used for the replacement service, it has been found preferable to use copper tubing as it is available in lengths sufficient to extend from the main to the inside of the basement without intermediate joints and can readily be drawn through the old service pipe. For convenience in terminology in identifying the old and the new services lines, the new service conduits will be referred to as tubing and the existing service line as pipe, although it will be understood that this terminology is not intended to indicate that there is necessarily any difference in the character of the two conduits.

The service pipe ordinarily enters the basement of the building below ground level and is connected by a riser T and riser pipe to a meter. In installing a replacement service, the old service pipe is cut off or disconnected at both ends and the new service is connected to the main in the street and to the riser pipe inside the building. If the connection of the new service to the riser pipe is made with an adaptor of the kind now available, the annular space between the replacement tubing and the old service pipe is left open. As the street end of the existing service pipe is also open, and as the pipe may in addition be corroded and full of holes, the old service pipe will act as a drain conducting water from the surrounding earth into the basement. Moreover, if there should be a gas leak underground, in the vicinity the escaping gas will be conducted into the basement by the discontinued service pipe.

An object of the present invention is to provide a pipe fitting which will connect the new service line to the building piping and simultaneously seal the annular space between the replacement service and the old service pipe to prevent the entry of any gas, water, etc., from the adjacent ground to the interior of the basement. Another object of the invention is to provide a pipe fitting making possible the installation of a replacement service with minimum disturbance of the existing piping in the building. A further object of the invention is to provide a pipe fitting which will facilitate the connection of the new service line quickly and easily without special tools and without the necessity of threading or flanging the new service tubing.

The nature of the invention and its objects and advantages will be more fully understood from the following description of the embodiments shown by way of example in the accompanying drawings, in which Fig. 1 is a vertical sectional view illustrating diagrammatically the installation of a replacement service in accordance with our invention, Fig. 2 is a longitudinal sectional view of a pipe fitting in accordance with the invention for connecting the replacement service pipe to the piping inside the building.

Fig. 5 is a longitudinal sectional view of another form of fitting.

Fig. 6 is a similar sectional view illustrating a modification of the fitting shown in Fig. 5.

Figure 3:
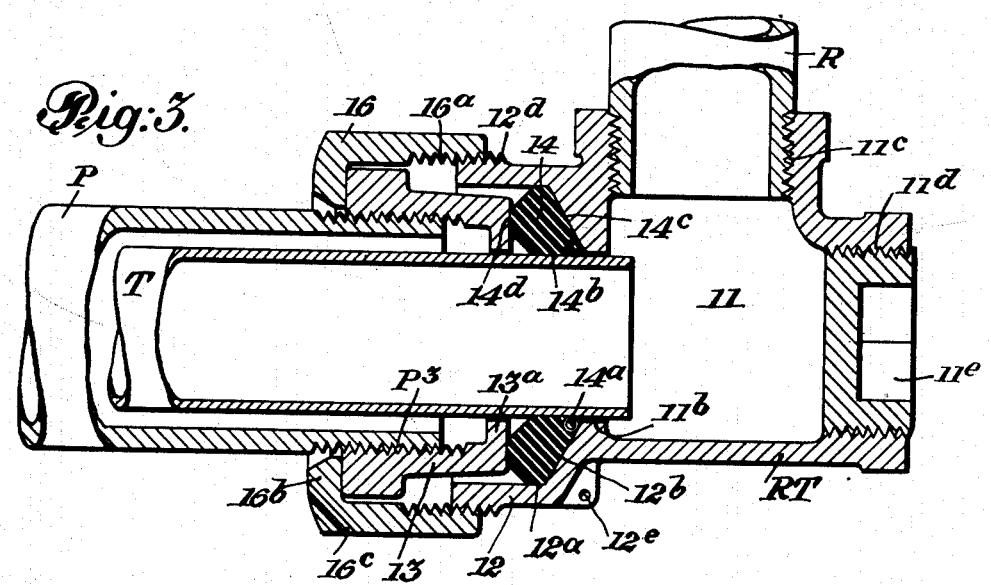
Fig. 3 is a longitudinal sectional view of another form of fitting assembled on the pipe but not yet tightened.

Fig. 1 illustrates the manner in which the replacement service is installed. Prior to replacement the old service pipe P extends from the main M through the ground and the basement wall W to the interior of the basement, where it is connected by a riser T RT and a riser pipe R to the meter $m$. In installing the replacement service, a small excavation is made at the point where the service joins the main and the old service pipe P is cut off, as indicated at P'. The other end of the old service pipe P is cut off inside the basement, and the short end portion resulting is unscrewed from the riser T RT and removed. The new service tube T, which is preferably copper tubing is then inserted through the disconnected service pipe P and one end of the tubing is connected to the main by a service T ST, while the other end is connected to the riser T RT by the novel fitting F. It will be seen that as the severed end P' of the old service P is left open, it is possible for water, gas or other materials to enter the annular space between the pipe P and the new service tubing T. However, the fitting F not only make a fluid-tight connection between the tube T and the building piping, but at the same time seals the annular space between the tube T and the pipe P, thereby preventing the entry of any gas, water or other fluid into the basement through the old service pipe.

The fitting F, in accordance with the present invention, is shown in detail in Fig. 2. The fitting comprises an annular body portion 1, having one end threaded externally at 1a, to screw into the riser T RT, or otherwise connect with the building piping. The body portion 1 has an aperture or bore 1b of proper diameter to receive the tube T and an outer sleeve portion 2 surrounding the aperture and the adjacent portion of the tube, and having its inner surface shaped to form a substantially cylindrical surface 2a of larger diameter than the aperture 1b, and an inclined frusto-conical surface 2b extending from the cylindrical surface 2a to the aperture. The end portion of the outer sleeve 2 is enlarged, as indicated at 2c to receive an inner sleeve or bushing 3, which fits over the end of the old service P, and has an end portion 3a of reduced diameter, which extends beyond the end of the pipe P, and forms in effect a continuation of said pipe. It will be seen from Fig. 2 that the end face of the reduced end portion 3a of the inner sleeve, together with the adjacent portion of the tube T and the inner surface of the outer sleeve portion 2, including the frusto-conical surface 2b, defines an annular gasket recess in which there is disposed a gasket 4. The gasket is formed of resilient deformable material such as rubber and may have one or more of its edges reenforced by metallic or other armor, as indicated at 4a. The opposite end of the inner sleeve member 3 is flared outwardly, as indicated at 3b, to provide an annular recess between the sleeve and the old service pipe P to receive an annular gasket 5. While this gasket is shown without reenforcing, it will be understood that it may be armored if desired. Surrounding the enlarged end portion 3b of the inner sleeve 3 and the enlarged end portion 2c of the outer sleeve 2 is a nut 6, threaded internally at 6a to engage external threads 2d provided on the outer sleeve 2, and having an inwardly projecting shoulder or flange 6b, for applying pressure to the annular gasket 5. A follower 7 of angular cross section may be interposed between the nut 6 and the gasket 5 to facilitate rotation of the nut. It will be seen that when the nut is drawn up by relative rotation of the nut and the outer sleeve 2, the nut will apply pressure to the gasket 5 and will also produce relative axial movement between the inner sleeve 3 and the outer sleeve 2, to apply pressure to the gasket 4, disposed between the tube T, the outer sleeve 2 and the reduced end portion of the inner sleeve 3. The outer sleeve portion 2 and the nut 6 may be provided with seal holes 2e and 6c respectively, to receive a sealing wire S as shown in Fig. 1, to prevent unauthorized tampering with the service connection.

The pipe fitting shown in Fig. 2 can be installed quickly and easily without disturbing the meter m, or dismantling the riser pipe R. After the old service pipe P has been cut off a short distance from the riser T RT, as indicated at P2 in Fig. 2, the severed end of the pipe is unscrewed from the T and the replacement tubing T is inserted in the pipe and allowed to project a short distance beyond the end thereof. The riser pipe R is sprung slightly to one side and the fitting part slipped over the end of the tubing T and pipe P, either separately or in loosely assembled relationship. The riser pipe is then released to its normal position and the threaded end 1a of the body portion of the fitting is screwed into the riser T RT. The nut 6 is then tightened applying pressure to both gaskets 4 and 5. It will be seen that gasket 5 makes a fluid tight connection between the inner sleeve 3 and the old service pipe P, while gasket 4 makes a tight connection between the outer sleeve 2 of the body portion 1 and the tubing T and simultaneously seals the annular space between the inner sleeve 3 and the tube T, which forms a continuation of the annular space between the tube and the old service pipe. Thus the fitting not only connects the replacement tubing to the building piping, but also closes off the discontinued service pipe P, thereby preventing said pipe from acting as a drain to conduct gas and water into the basement. It will be noted that the fitting is installed with a minimum number of operations, and without dismantling the building piping, and that the installation requires no tools other than a hacksaw and a wrench.

Figure 4:
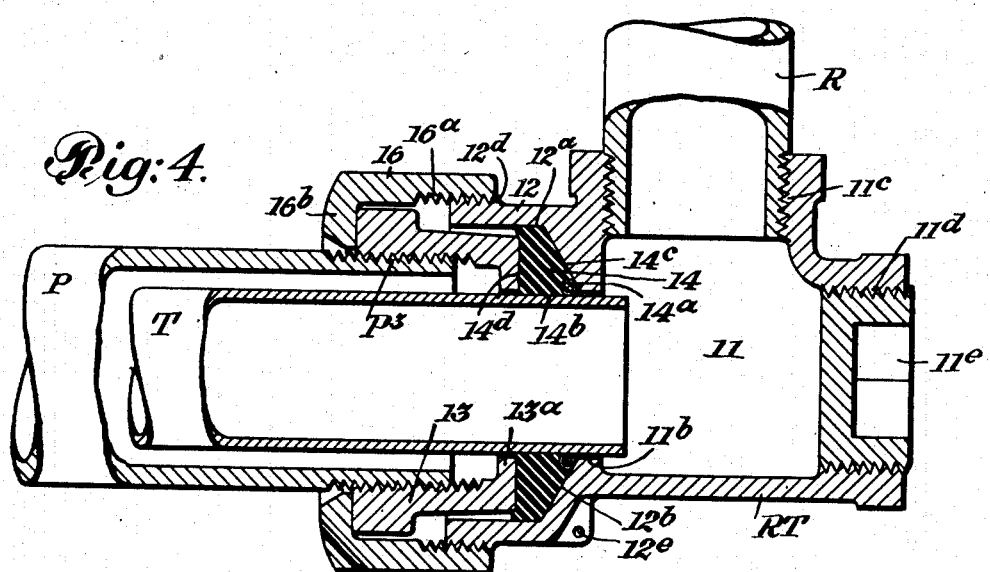
Fig. 4 is a view corresponding to Fig. 3 showing the fitting after it has been tightened to compress the gasket.

Another embodiment of the invention is shown in Figs. 3 and 4, in which corresponding pipes are designated by the same reference letters and corresponding parts of the fitting are designated by the same reference numerals as in Fig. 2, with the addition of 10. The body portion 11 of the fitting is in the form of a T having an aperture 11b for the replacement service tube T, a threaded opening 11d through which a rod or other instrument can be inserted to clean out the service line. The opening 11d is normally closed by a plug 11e having a socket for a special wrench to prevent unauthorized removal of the plug with ordinary tools. Surrounding the aperture 11b is an outer sleeve portion 12, having its inner surface formed to provide a substantially cylindrical surface 12a, and a frusto-conical surface 12b. An internally threaded bushing 13 is screwed onto a threaded end portion P3 of the old service pipe P and has a reduced end portion 13a, which extends beyond the end of the pipe and forms a continuation thereof. The reduced end portion of the bushing 13 extends into the outer sleeve portion of the fitting body and cooperates with the inner surface of the outer sleeve 12 and with the adjacent portion of the wall of the tube T to form an annular gasket recess. It will be seen that this gasket recess is of trapezoidal cross-section, having parallel sides formed by the tube wall and the cylindrical inner surface of outer sleeve 12, and non-parallel sides formed by the end face of bushing 13 and the inclined frusto-conical surface of the outer sleeve 12. The recess accommodates a gasket 14, which is preferably reenforced, as indicated at 14a. In its uncompressed condition, as shown in Fig. 3, the gasket 14, does not conform in cross-section to the cross-section of the gasket recess. Instead of having a quadrilateral cross section the gasket has a greater number of sides than the gasket recess, being shown as hexagonal in cross section. Two surfaces of the gasket, namely a cylindrical surface 14b and a frusto-conical surface 14c conform respectively to the surface of the tube T and the frusto-conical surface 12b of outer sleeve 12, but the remaining surfaces of the gasket do not conform with the end face of the bushing 13, and engage said bushing over an area of limited radial extent, as indicated at 14d.

Means for applying pressure to the gasket 14 comprises a nut 16, which is threaded internally at 16a to engage threads 12d on the outer sleeve portion 12, and has a shoulder or flange 16b engaging the bushing 13. Rotation of the nut 16 in a direction to screw it onto the outer sleeve portion 12 produces relative coaxial movement of the outer sleeve 12 and the bushing 13, thereby applying pressure to the gasket 14 and causing it to conform wholly or more nearly in cross section to the gasket recess (Fig. 4). When the nut 16 has been drawn up the gasket 14 provides a fluid tight connection between the tube T and the body portion 11 of the fitting, and also seals the annular space between the tube T and the old service pipe P, thereby effectively closing off the discontinued service pipe. By reason of the cross-sectional shape of the gasket in relation to that of the gasket recess an effective seal is obtained with the application of minimum torque in turning up the nut 16. The body portion of the fitting and the nut 16 may be provided with holes 12e and 16c for a sealing wire, as in the embodiment shown in Figs. 1 and 2.

In installing the fitting shown in Figs. 3 and 4, the riser T RT (Fig. 1) is removed and the replacement tubing T is inserted in the old service pipe P, being allowed to project a short distance beyond the end of the pipe. The threaded portion P3 on the end of the old service pipe may be the original threads, or if desired the pipe may be cut off and rethreaded. The nut 16 is slipped over the end of the old service pipe P and the bushing 13 is screwed onto the threaded portion P3 of the pipe. By springing the riser pipe R to one side of or away from the service pipe, the fitting body 11 may be screwed onto the lower end of the riser and then slipped into place over the bushing 13 and the end of the tubing T, the gasket 14b interposed between the bushing and the fitting body. The nut 16 is thereupon threaded onto the outer sleeve portion 12 of the fitting and is drawn up tight to apply sealing pressure to the gasket. It will be understood that in each instance the other end of the replacement tubing T will be connected to the main M by a suitable fitting (Fig. 1).

In Fig. 5 there is shown a further form of the invention in which corresponding parts of the fitting are indicated by the same reference numerals as in Fig. 2 with the addition of 20. The embodiment of Fig. 5 is exactly the same as that of Figs. 3 and 4 except that the body portion 21 of the fitting is in the form of an L instead of a T. The lower part of the body portion 21 is shaped to provide a pocket 21f to trap any condensation or sediment in the pipe and prevent its clogging the service line. As the outer sleeve portion 22, bushing 23, gasket 24 and nut 26 are substantially the same as the corresponding parts of the fitting shown in Figs. 3 and 4, it is believed that the construction of this embodiment is entirely clear without more detailed description. The fitting may be installed in the same manner as described in conjunction with Figs. 3 and 4.

A further embodiment of the invention is shown in Fig. 6, in which corresponding parts of the fitting are designated by the same reference numerals as in Fig. 2 with the addition of 30. The fitting body 31 is in the form of an L, with an aperture 31b to receive the service tubing T and an aperture 31g for connection to the building piping represented by the riser pipe R. The fitting has an outer sleeve portion 32, bushing 33, gasket 34 and nut 35 of substantially the same construction as described in conjunction with Figs. 3 and 4. Outwardly of the aperture 31g the inner surface of the fitting body is flared outwardly to form, in conjunction with the wall of riser pipe R, a gasket recess to receive a gasket 38. Sealing pressure is applied to the gasket by a nut 39, which is threaded internally to engage external threads 31h provided on the body portion of the fitting. A gasket follower 38a may be interposed between the gasket 38 and nut 39 to facilitate turning the nut without disturbing the gasket. The body portion 31 is preferably formed to provide a drip pocket 31f and may also have a lug or stop 31j to limit the extent of the riser pipe R into the fitting. The fitting shown in Fig. 6 is installed in much the same manner as those of Figs. 3, 4 and 5. As no threads are required on the riser pipe R, this pipe may be cut off adjacent to the riser T RT, and the T may then be unscrewed from the end of the old service pipe P. After inserting the replacement tube T in the discontinued service pipe the nut 36 is slipped over the end of the pipe and bushing 33 is screwed into place. The fitting body 31, preferably with gasket 38, gasket follower 38a and nut 39, loosely assembled thereon, is slipped over the lower end of riser pipe R and over the end of the tubing T, the gasket 34 being previously slipped over the end of the tubing or positioned in the gasket recess of the fitting body. Nuts 36 and 39 are thereupon tightened to apply sealing pressure to the gasket.

Figure 7:
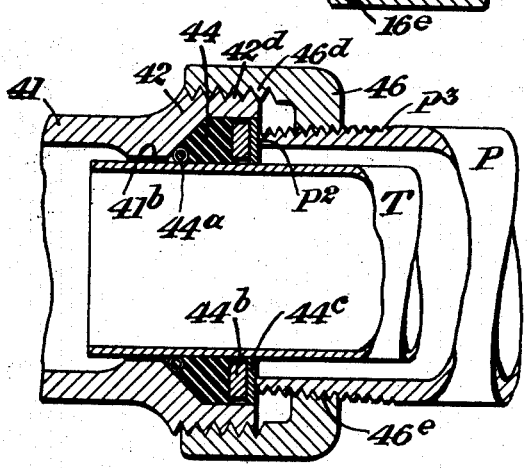
Fig. 7 is a fragmentary longitudinal sectional view of a further embodiment of the invention.

In Fig. 7 there is shown a fragmentary view of a further form of fitting in which corresponding parts are designated by the same reference numerals as in Fig. 2 with the addition of 40. The body portion 41 of the fitting may be formed as a sleeve coupling, an L, T or other form, as desired, and has an aperture 41b to receive the replacement service tube T. Adjacent the aperture 41b there is provided a sleeve portion 42, which is of greater internal diameter than the aperture, and provides an annular gasket recess between the sleeve, the tube and the end face P2 of the old service pipe P. A gasket 44 provided in said recess is preferably protected from being cut by the end of the pipe, for example, by a washer of reenforcing material. In the drawings there is shown a composite washer comprising a steel layer 44b and a lead layer 44c. The gasket and washer are preferably cemented together as a unit to prevent loss or reversal of the washer. The inner edge of the gasket may be protected by metal reenforcing 44a. Sealing pressure is applied to gasket 44 by a nut 46 having a threaded portion 46d adapted to engage threads 42d, provided on the sleeve portion 42, and a second threaded portion 46e, adapted to engage the threaded end P3 of the old service pipe P. The threads on the threaded portion 46d and 46e are of different direction or pitch to provide a differential screw action, which will produce relative axial movement of the sleeve 42 and pipe P upon rotation of nut 46. Threads 46e are preferably standard pipe threads in order that standard threads may be used on the end of the service pipe. Threads 46d are either left hand threads or, as in the embodiment shown, are threads of greater pitch than threads 46e.

To install the fitting of Fig. 7, the replacement tubing T is inserted in the old service pipe P, as described above. The nut 46 is screwed onto the threaded end P3 of the old service pipe P and the composite gasket 44 with its protecting metal washer is slipped over the end of the new service tube T. The sleeve portion 42 is then screwed loosely into the nut 46 and, as a final operation, the nut 46 is tightened with a wrench. In this tightening operation the nut will be turned in a direction to unscrew it slightly from the pipe P, but it will be understood that by reason of the higher pitch of threads 46d, the nut will be screwed onto sleeve 42 more rapidly than it will be backed off of pipe P, and the resultant action will be that the pipe and sleeve are drawn toward one another, applying pressure to gasket 44. If threads 46d and 46e differ in direction, the nut will be screwed further on both the sleeve and the pipe, when being tightened. Upon application of pressure to gasket 44, the gasket will provide a fluid tight connection between the new service tubing T and the body portion of the fitting, and will also close off the annular space between the new service tube and the discontinued service pipe P. As this annular space will never be under appreciable pressure an adequate seal is provided by engagement of the lead face 44e of the gasket with the end of the old service pipe. Since the annular space between the tube T and the pipe P is sealed by the gasket 44, the thread connections between the nut 46 and the pipe need not be tight, and even though the nut is backed partially off of the pipe when tightening the nut on sleeve 42, the old service pipe will nevertheless be effectively closed off.

While several forms of the invention have been described by way of example, it will be understood that fittings in accordance with the invention may be made in other forms as desired.

What we claim and desire to secure by Letters Patent is:

1. In a service head fitting for connecting the piping of a building with a replacement tube extending through a discontinued service pipe with an annular space therebetween and terminating shortly beyond the end of said pipe, a fitting body adapted to be connected to the building piping and having a bore to receive the end portion of said tube and a sleeve portion surrounding said bore and having an outwardly flared inner surface forming an annular gasket recess between said tube and sleeve adjacent the end of said pipe, a gasket in said gasket recess and means for applying pressure to said gasket to make a fluid tight joint between said replacement tube and the building piping and simultaneously close off the annular space between said tube and the discontinued service pipe.

2. In a service head fitting for connecting the piping of a building with a replacement tube extending through a discontinued service pipe and terminating shortly beyond the end of said pipe, the combination of an inner sleeve portion fitting over the end of said pipe, a fitting body adapted to be connected to the building piping and having a bore to receive the end portion of said tube and an outer sleeve portion surrounding said inner sleeve and providing an annular gasket space between the tube and outer sleeve portion adjacent the end of said inner sleeve portion, a gasket in said recess, and means for producing relative axial movement of the inner sleeve and outer sleeve to apply pressure to the gasket to provide a fluid tight joint between the replacement tube and the building piping and seal the annular space between said tube and the discontinued service pipe.

3. In a service head fitting for connecting the piping of a building with a replacement tube extending through a discontinued service pipe with an annular space therebetween and terminating shortly beyond the end of said pipe, the combination of an inner sleeve portion surrounding the end of said pipe and providing an annular gasket space between said sleeve and pipe, a fitting body adapted to be connected to the building piping and having a bore to receive the end portion of said tube and an outer sleeve portion surrounding said inner sleeve and providing an annular gasket space between the tube and outer sleeve portion adjacent the end of said inner sleeve portion, a gasket in each of said gasket spaces, and means for applying pressure to the gaskets to provide a fluid tight seal between the inner sleeve portion and the pipe and between the inner sleeve portion, the outer sleeve portion and the tube.

4. In a service head fitting for connecting the piping of a building with a replacement tube extending through a discontinued service pipe with an annular space therebetween and terminating a short distance beyond the end of said pipe, the combination of an inner sleeve having a portion of enlarged internal diameter surrounding the pipe and providing an annular gasket space between said sleeve and pipe, and a portion of reduced internal diameter extending beyond the end of the pipe, a body portion adapted to be connected with the building piping and having an externally threaded outer sleeve portion surrounding the end portion of said tube and the reduced end portion of the inner sleeve and providing an annular gasket space between the tube, the outer sleeve portion and the reduced end portion of the inner sleeve, a gasket in each of said gasket spaces, and a nut surrounding the enlarged end portion of the inner sleeve and having an inwardly projecting flange for applying pressure to the gasket disposed between the inner sleeve and the pipe, and internal threads engaging the external threads on the outer sleeve, said nut being adapted to be drawn up by said threads to apply pressure to said last mentioned gasket and to produce relative axial movement between the inner sleeve and the outer sleeve to apply pressure to the gasket disposed between the tube, the outer sleeve and the reduced end portion of the inner sleeve.

5. In a service head fitting for connecting the piping of a building with a replacement tube extending through a discontinued service pipe with an annular space therebetween and terminating shortly beyond the end of said pipe, the combination of a bushing threaded onto the end of said pipe and having an end portion of reduced internal diameter providing an opening through which said tube passes, a fitting body having means for connecting said body to the building piping and having a bore to receive the end portion of said tube, and an externally threaded sleeve portion surrounding said bore and providing an annular gasket recess between the tube, the reduced end portion of the bushing and said sleeve, and an internally threaded nut engaging the threads of said sleeve and having a shoulder engaging said bushing to produce relative axial movement between the bushing and sleeve portion of the fitting body to apply pressure to said gasket when the nut is drawn up to make a fluid tight joint between the replacement tube and the building piping and seal the space between said tube and the discontinued service pipe.

6. In a service head fitting for connecting the piping of a building with a replacement tube extending through a discontinued service pipe with an annular space therebetween and projecting slightly beyond the end of said pipe, the combination of a body portion adapted to be connected with the building piping and having a sleeve portion surrounding the end portion of said tube and providing an annular gasket recess between the sleeve, the tube and the end of the pipe, the exterior of said sleeve being provided with threads of different pitch or direction from threads provided on said pipe, a gasket in said gasket recess, and a nut having threaded portions to engage the threads of the pipe and the sleeve respectively, whereby rotation of the nut will effect relative axial movement between the pipe and the sleeve and apply pressure to the gasket to make a fluid tight joint between the tube and sleeve and simultaneously seal the annular space between the pipe and tube.

7. In a pipe fitting for connecting the piping of a building with a replacement tube extending through a discontinued service pipe with an annular space therebetween and projecting a short distance beyond the end of said pipe, the combination of a body portion adapted to be connected to the building piping and having a bore to receive said tube, an externally threaded cylindrical sleeve portion surrounding said bore and having an inclined, frustro-conical surface to form an annular gasket recess of trapezoidal cross section, a gasket of resilient deformable material having cylindrical and frusto-conical surfaces conforming to the recess-forming surfaces of said tube and sleeve, and a further surface not conforming with the end face of said bushing but adapted in uncompressed condition of the gasket to be engaged by said face over an area of limited radial extent, and an internally threaded nut for drawing said sleeve and bushing toward one another to apply pressure to the gasket to force it into close engagement with the surfaces of the gasket recess including the end face of said bushing.

FREDERICK T. NEWELL.
GEORGE E. SZEKELY.